Oct. 9, 1956     A. A. ROBERT ET AL     2,765,840
HEADREST
Filed Jan. 10, 1955     2 Sheets-Sheet 1
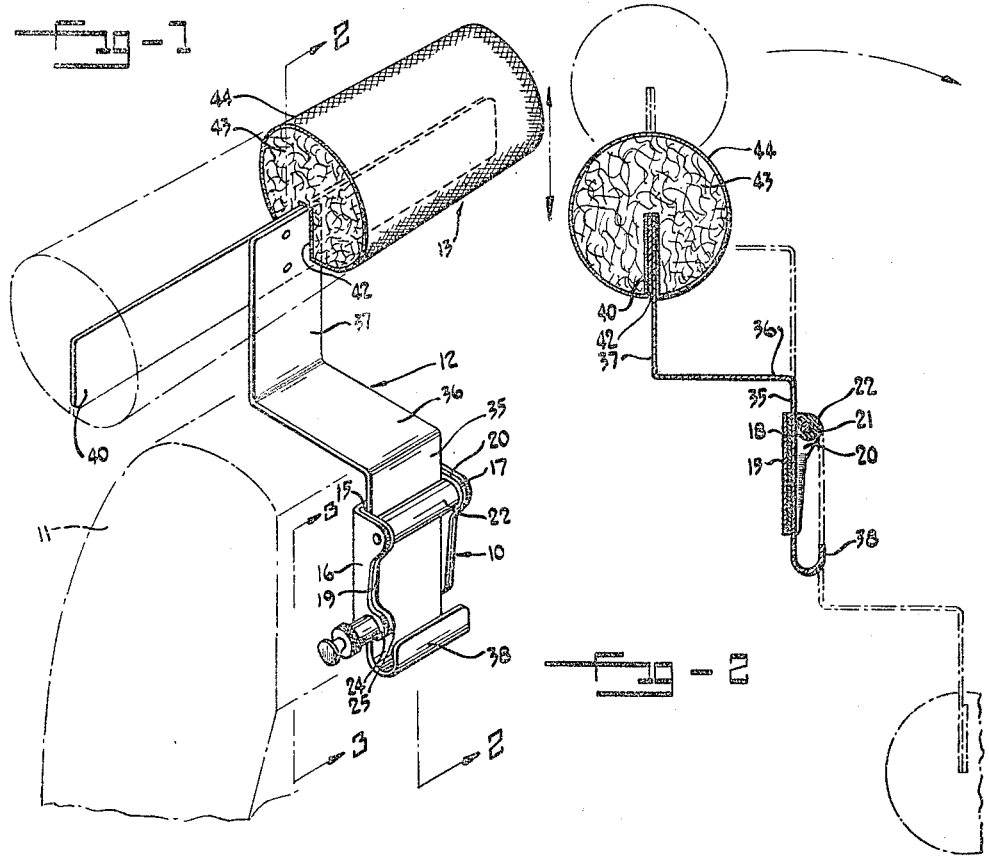
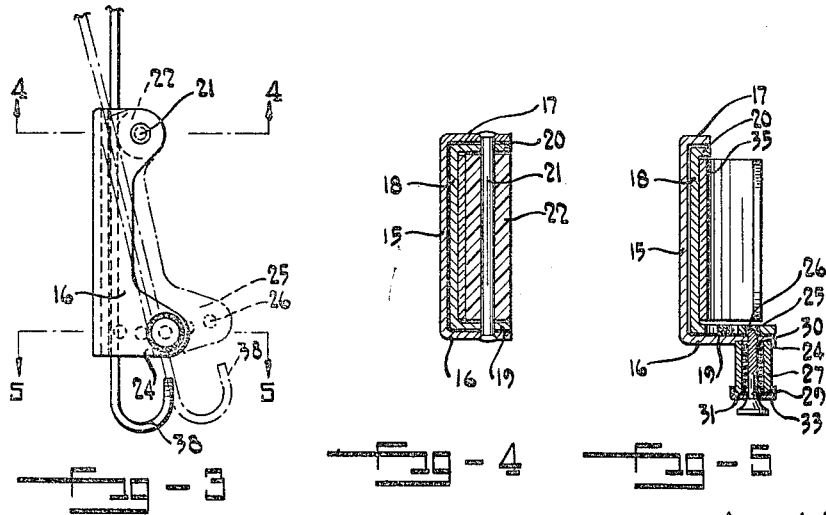
INVENTORS
ALAN A. ROBERT and
BY   RUDOLPH R. STOESSEL
*Fulwider, Mattingly & Huntley*
ATTORNEYS

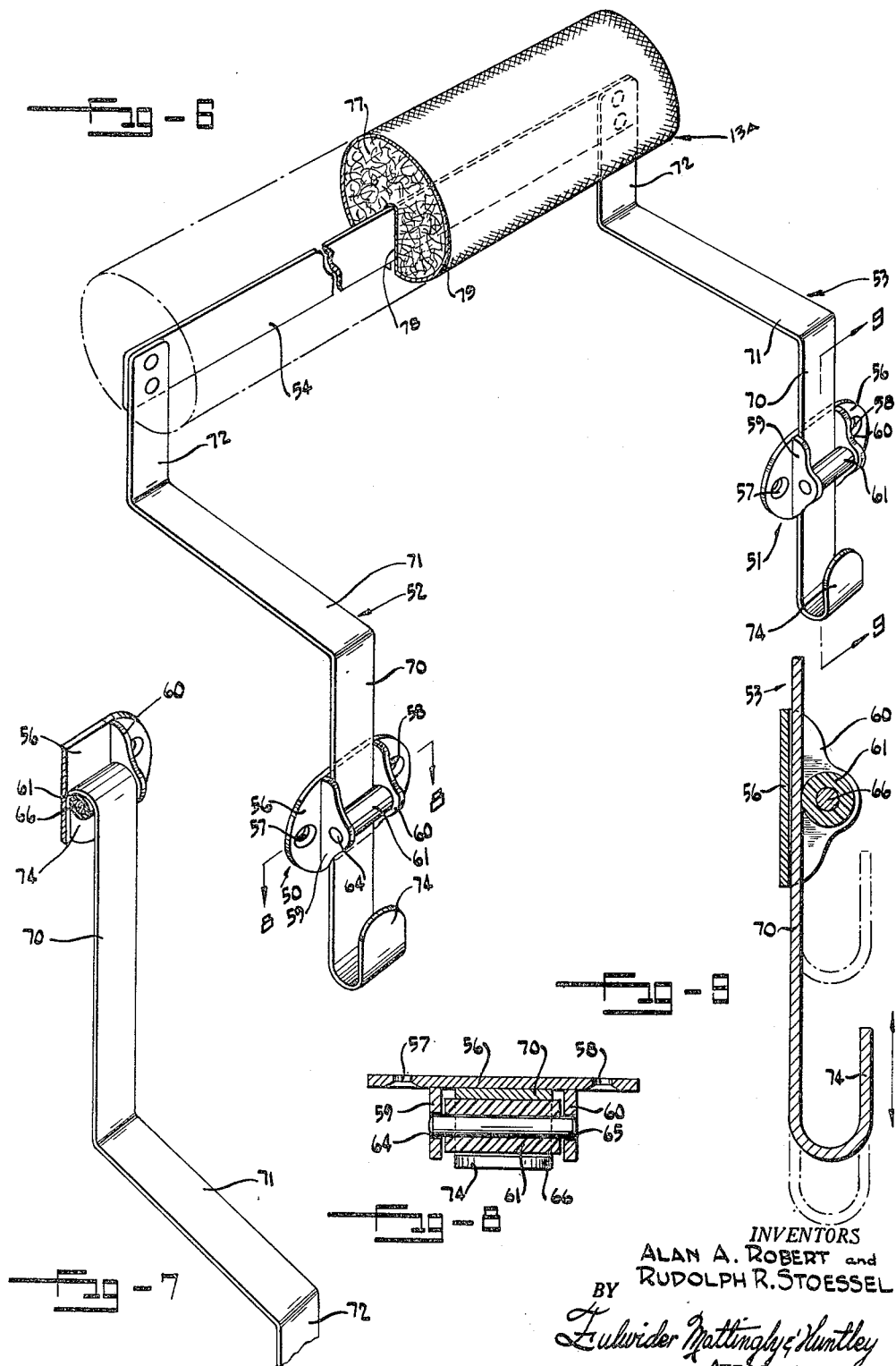

United States Patent Office 2,765,840
Patented Oct. 9, 1956

2,765,840

HEADREST

Alan A. Robert and Rudolph R. Stoessel, Los Angeles, Calif., assignors to Coachcraft, Ltd., Los Angeles, Calif., a corporation of California Application January 10, 1955, Serial No. 480,650

9 Claims. (Cl. 155—177)

Our invention relates generally to head rests and more specifically to an adjustable head rest for attachment to a seat such as that of a vehicle.

One of the major causes of the present day high rate of automobile accidents may be traced to driver fatigue. When the driver becomes fatigued, his attention is apt to wander from the task of driving and his physical reaction time is slowed to a point of danger. Also fatigue, particularly at night, frequently is the cause of the driver going to sleep while driving.

It is well known that holding any part of the human body in a fixed position for an extended period of time results in fatigue unless that part is rested in a relaxed position. During long periods of driving, most parts of the body are moved in operating the vehicle. However, the head and neck are usually held in a fixed, stationary position in order to watch the road. The muscles of the neck are therefore subject to fatigue which creates a danger in driving.

One of the primary objects of our invention is to provide a head rest which will materially reduce driver fatigue and make long distance driving less hazardous. It is also an object of our invention to provide a head rest which can be quickly and easily attached to the back rest of the driver's or passenger's seat of substantially any vehicle.

Modern automobiles vary greatly in the height and thickness of the back rest of the driver's seat. It is therefore a further object of our invention to produce a head rest which is readily adjustable to compensate for these differences as well as the differences in the body build of the individual driver.

It is still a further object of our invention to provide a head rest which is readily adjustable both vertically and horizontally in a forward or backward position.

Still another object of our invention is to provide a head rest which can be pivoted rearwardly out of the way, or entirely removed when not in use.

We also have as one of the objects of our invention to provide a head rest for attachment to the back of the seat which is rugged and yet which can be produced at relatively low cost.

Still another object of our invention is to provide a head rest for attaching to the back of the seat which is neat in appearance and can be made to blend in with the decorative scheme of the vehicle.

It is also among the objects of our invention to provide a head rest having a head supporting member which may be provided with a readily removable cover to facilitate in keeping it clean and free from an accumulation of grease, dirt and hair oils.

These and other objects and advantages will become apparent from a more detailed description of our invention and from the drawings in which:

Figure 1 is a perspective view of one of the preferred forms of our invention;

Figure 2 is a sectional elevation taken on line 2—2 of Figure 1;

Figure 3 is an enlarged fragmentary side elevation of the lower end of the head rest shown in Figure 1 and taken from line 3—3 of Figure 1;

Figure 4 is a sectional view taken on line 4—4 of Figure 3;

Figure 5 is a sectional view taken on line 5—5 of Figure 3;

Figure 6 is a perspective view of another form of our invention;

Figure 7 is a fragmentary perspective view of one end of the head rest shown in Figure 6 and illustrating its retracted position;

Figure 8 is a sectional view taken on line 8—8 of Figure 6; and

Figure 9 is a sectional view taken on line 9—9 of Figure 6.

Referring now to the drawings and particularly Figure 1 thereof, we have illustrated one preferred form of our invention which includes a bracket designated generally by the numeral 10 secured to the back of an automobile seat (shown in phantom and identified by the numeral 11), the bracket carrying an upwardly and forwardly extending arm designated generally as 12 and a head rest pad identified generally by the numeral 13.

In Figures 2 to 5 inclusive, we have shown our invention in more detail. The bracket 10 is preferably formed of a relatively flat plate 15 which may be provided with attaching means (not shown) for securing the plate 15 to the seat 11. The side edges of the plate 15 are bent rearwardly to form substantially parallel sides or flanges 16 and 17 defining a channel therebetween. As herein used, the terms "rearwardly" and "forwardly" have reference to the rear and front of the vehicle in which our invention will be used.

A swivel plate 18 having sides 19 and 20 is disposed to fit in the channel defined by the sides 16 and 17. Plate 18 is pivotally secured adjacent its upper end in said channel by an axle 21 which extends through coaxial apertures in the sides 16, 17, 19 and 20. Friction means such as roll 22 are supported by the axle 21 the purpose of which will become apparent later.

Sides 16 and 19 of the bracket 10 and swivel plate 18, respectively, are formed with complementary ears 24 and 25 adjacent the lower edge thereof. The ear 25 of swivel plate 18 is formed with a series of apertures or sockets 26 that continues into the side 19, the apertures being spaced along an arc having its center coaxial with the axle 21.

The ear 24 of the bracket 10 carries cylindrical spring housing 27 which is placed to align with the apertures 26 as the swivel plate 18 is pivoted. A pin 29 having a flange 30 is disposed for reciprocal movement in the cylindrical housing 27, and is biased inwardly by spring 31. Spring 31 is held in compression by cap 33 which is threadedly secured to the top of the cylindrical housing 27.

The pin 29 extends into one of the apertures or sockets 26 to hold the swivel plate 18 at the desired angle. By pulling outwardly on the pin 29, the swivel plate 18 can be moved inwardly or outwardly to any desired angle as is best illustrated in Figure 3, to thereby adjust the forward or rearward position of the head rest 13.

As will be seen best in Figures 1 and 2 the arm 12 is preferably formed of a flat relatively stiff material such as metal, and has a vertical mounting section 35, an arm 36 extending forwardly from the top of mounting section 35 and a pad supporting section 37 extending vertically from the forward end of the arm 36.

The mounting section 35 is slideably disposed between the swivel plate 18 and the roll 22. It will be understood that the spacing of the roll 22 from the plate 18 is slightly less than the thickness of the vertical arm section 35 and the roll 22 is provided with a resilient surface (or may be resiliently mounted) so there is a resilient frictional engagement between the roll 22 and the section 35 as well as between the plate 18 and the section 35. The arm 12 can therefore readily be adjusted up or down to vary the height of the pad 13 as desired to fit the body proportions of the user and will be held in its adjusted position by the above described frictional engagement.

The mounting section 35 is formed with its bottom end bent to define an upwardly open hook 38. The arm 12 may be moved upwardly until the hook 38 receives the roll 22 and the entire head rest assembly may then be swung rearwardly and down (as indicated in phantom in Figure 2) in the event its use is not desired. When the arm 12 in its upright position is pushed downwardly so the hook 38 no longer encloses the roll 22, the arm will not rotate rearwardly because of the lever action between the section 35, the swivel plate 18 and the roll 22. The hook 38, it will be appreciated, prevents accidental disengagement of the arm 12 from the supporting bracket 10, while still permitting the head rest 13 to be moved out of the way when so desired.

A cross bar or frame 40 is secured in a horizontal position adjacent the top of the arm 37 and holds the pad 13 in position. The frame 40 may be secured to the arm section 37 by any suitable means such as spot welding.

Pad 13 is preferably but not necessarily cylindrical in shape and has a slot 42 adapted to receive the cross frame 40 in frictional engagement. The pad 13 is composed of a relatively soft interior 43 and may be covered with a decorative material such as fabric 44, which can be made removable for purposes of sanitation, and which can be held in place by the frictional engagement of the frame 40 when forced into the slot 42.

Referring now to Figures 6 to 9 inclusive, we show a modified form of head rest in which the horizontal adjustment feature of the first form is omitted, but which has a pair of spaced mounting brackets designated generally as 50 and 51 that increase the lateral stability of the head rest. A pair of upwardly and forwardly extending arms designated generally as 52 and 53 are adjustably supported by the brackets 50 and 51 and carry a horizontal bar adjacent the upper end of the arms that in turn receives a head rest pad 13A generally similar to the pad 13 of Figures 1 to 5 inclusive.

The mounting brackets 50 and 51 are preferably similar to each other and include plates 56 each having holes 57 and 58 for receiving attaching screws, rearwardly extending spaced ears 59 and 60, and a friction roll 61 disposed between said ears and in spaced relation to said brackets 50 and 51. The ears 59 and 60 are formed with coaxial apertures 64 and 65 to receive axle 66 which rotatably supports the friction roll 61.

The arms 52 and 53 are preferably identical and are bent to include vertical sections 70, forwardly extending section 71 supported by the upper end of sections 70, and vertical sections 72 supported by the forward end of the forwardly extending sections 71.

The vertical sections 70 are disposed between the plates 56 and the resilient rolls 61. The frictional engagement between the rolls 61 and the sections 70 permits vertical adjustment of the bar 54 and hence the pad 13A in much the same manner as heretofore described in connection with the form shown in Figures 1 to 5 inclusive.

Vertical sections 70 are formed with their lower ends bent to define upwardly open hooks 74 which engage the rolls 61 when raised to the proper height to thereby permit the head rest to be swung rearwardly and downwardly when not in use. When the arms 52 and 53 are in the upright position and are pushed downwardly so the hooked ends 74 are out of engagement with the rolls 61, the arms 52 and 53 cannot be rotated rearwardly because of the lever action against the plates 56 and the rolls 61.

The head rest pad 13A, as pointed out above is similar to the head rest pad 13 of Figures 1 to 5 inclusive and includes a soft or resilient interior 77 which may have a slot 78 to receive the horizontal bar 54. A decorative cover 79 preferably covers the resilient interior 77, and as in the first described form, this cover may be made removable if so desired.

The illustrations as shown are by way of example only and are not intended as limitations. It will be readily understood that the single arm form shown in Figures 1 to 5 inclusive can be produced with the fixed attitude mounting bracket as shown in Figures 6 to 9 inclusive and that the form with two arms may be provided with the pivotal mounting shown in Figures 1 to 5 inclusive. Other variations are clearly possible, and the only limitations to be applied to our invention are those set forth in the appended claims.

We claim:

1. A head rest of the class described comprising: securing means including a mounting plate; a pivot plate pivotally held to said mounting plate for movement forwardly and rearwardly; locking means for holding said pivot plate in a selected position; friction means mounted on said securing means spaced from said pivot plate; a supporting arm between said pivot plate and said friction means and adjustably held in position by engagement with said friction means; and a head rest supported by said arm adjacent its upper end.

2. A head rest of the class described comprising: securing means including a channel shaped mounting plate having side flanges; a pivot plate swingably held to said mounting plate for pivotal movement forwardly and rearwardly; locking means for holding said pivot plate in a selected position; a resilient friction roll spaced from said pivot plate; a supporting arm adjustably disposed in frictional engagement between said pivot plate and said friction roll; and a head rest supported by said arm at its upper end.

3. A head rest of the class described comprising: securing means including a channel shaped mounting plate having side flanges; a pivot plate swingably held to said mounting plate for pivotal movement forwardly and rearwardly; locking means for holding said pivot plate in a selected position; a resilient friction roll spaced from said pivot plate; a supporting arm adjustably disposed in frictional engagement between said pivot plate and said friction roll; said arm extending upwardly and forwardly from said securing means and having an upwardly open hook at its lower end; and a head rest supported by said arm at its upper end.

4. A head rest of the class described comprising: securing means including a channel shaped mounting plate having side flanges; a pivot plate swingably held to said mounting plate for pivotal movement forwardly and rearwardly; locking means for holding said pivot plate in a selected position; a resilient friction roll spaced from said pivot plate and coaxial with the axis of pivot; a supporting arm adjustably held in frictional engagement between said pivot plate and said friction roll, said arm extending upwardly and forwardly from said securing means and having an upwardly open hook at its lower end adapted to engage said friction roll when said arm is at its extreme upper position to thereby permit rotation of said arm rearwardly and downwardly; and a head rest supported by said arm.

5. A head rest of the class described comprising: securing means including a channel shaped mounting plate having rearwardly extending flanges; a pivot plate having rearwardly extending flanges and mounted in said channel of said mounting plate for pivotal movement forwardly and rearwardly, one of said flanges being formed with a plurality of apertures spaced circumferentially around the pivotal axis; locking means for holding said pivot plate in a selected position including a pin supported by the flange of said channel plate adjacent said apertures and resiliently biased into any preselected one of said apertures; a resilient friction roll spaced from said pivot plate and coaxial with its axis of pivotal movement; a supporting arm of relatively flat rigid material disposed in frictional engagement between said pivot plate and said friction roll, said arm extending upwardly and forwardly from said bracket and having a lower end formed with an upwardly open hook adapted to engage said friction roll when said arm is at its extreme upper position to thereby permit rotation of said arm rearwardly and downwardly; and a pad supported by said arm.

6. A head rest comprising: securing means including a mounting plate having side flanges; a resilient friction roll rotatably supported between said flanges and spaced from said mounting plate; a supporting arm of relatively flat rigid material disposed in frictional engagement between said plate and said friction roll, said arm extending upwardly and forwardly from said securing means and having a lower end formed with an upwardly open hook adapted to engage said friction roll when said arm is at its extreme upper position to thereby permit rotation of said arm rearwardly and downwardly; and a head rest supported by said arm.

7. An attachment for an automobile seat comprising: means securable to the rear of an automobile seat and including a mounting plate having rearwardly extending flanges; friction means supported between said flanges and spaced from said mounting plate; a pad supporting arm adjustably disposed in frictional engagement between said plate and said friction means, said arm extending upwardly and forwardly from said bracket and having a lower end formed with an upwardly open hook adapted to engage said friction means when said arm is at its extreme upper position to thereby permit rotation of said arm rearwardly and downwardly; and a head rest pad supported by said arm at the upper end thereof.

8. An attachment for an automobile seat comprising: a plurality of brackets securable to the rear of an automobile seat, each said bracket including a channel mounting plate having rearwardly extending side flanges, and a friction roll mounted in spaced relation from said plate; pad supporting arms of relatively flat rigid material adjustably disposed in frictional engagement between each said plate and the respective friction rolls, each said arm extending upwardly and forwardly from its respective bracket; a horizontally extending bar secured to the top of each arm; and a pad supported by said horizontal bar.

9. An attachment for an automobile seat comprising: a plurality of brackets securable to the rear of an automobile seat, each said bracket including a channel mounting plate having rearwardly extending side flanges, a pivot plate secured to said mounting plate for pivotal movement forwardly and rearwardly, locking means for holding said pivot plate in a selected position, and a friction roll mounted in spaced relation from said pivot plate and coaxial with the axis of pivot; pad supporting arms of relatively flat rigid material adjustably disposed in frictional engagement between each said pivot plate and the respective friction rolls, each said arm extending upwardly and forwardly from its respective bracket; a horizontally extending bar secured to the top of each arm; and a pad supported by said horizontal bar.

References Cited in the file of this patent

UNITED STATES PATENTS

| | | |
|---|---|---|
| 668,765 | Beach | Feb. 22, 1901 |
| 2,045,225 | Glasgow | June 23, 1936 |
| 2,545,313 | Sawyer | Mar. 13, 1951 |
| 2,560,925 | Brown | July 17, 1951 |
| 2,666,476 | Lycan | Jan. 19, 1954 |